Oct. 7, 1947.  G. SLAYTER  2,428,591
INSULATING FABRIC
Filed Dec. 8, 1943  2 Sheets-Sheet 1

INVENTOR.
Games Slayter
BY
Attorneys

Oct. 7, 1947.    G. SLAYTER    2,428,591
INSULATING FABRIC
Filed Dec. 8, 1943    2 Sheets-Sheet 2
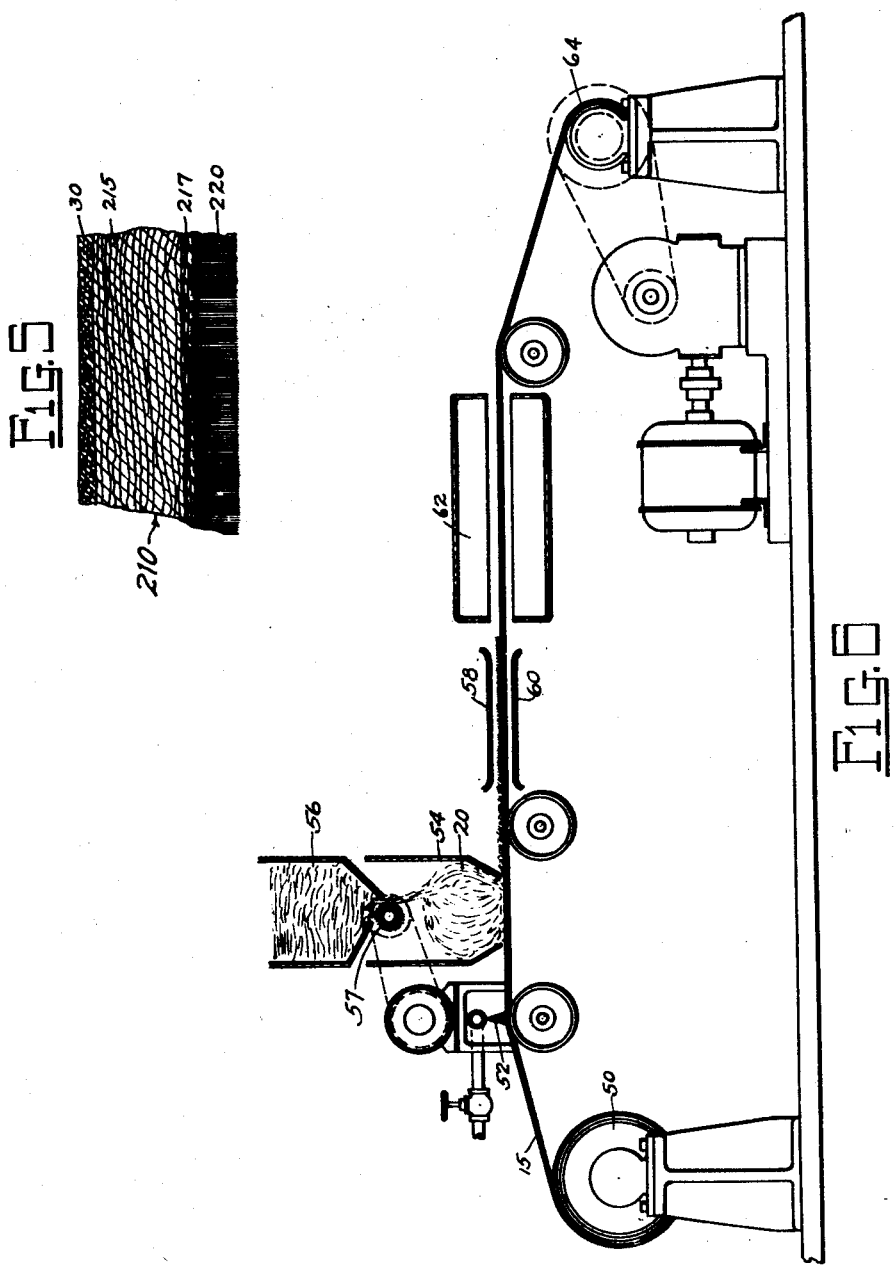
INVENTOR.
Games Slayter
BY
Attorneys Patented Oct. 7, 1947

2,428,591

UNITED STATES PATENT OFFICE 2,428,591

INSULATING FABRIC

Games Slayter, Newark, Ohio, assignor to Owens-Corning Fiberglas Corporation, a corporation of Delaware Application December 8, 1943, Serial No. 513,658

2 Claims. (Cl. 154—44)

This invention relates primarily to linings or interior wall coverings for enclosures such as rooms and especially for vehicles such as aircraft, automobiles, railroad cars and the like in which it is desired to have a decorative interior finish.

In vehicles, especially aircraft, railroad cars, and busses, it is desirable to provide a sound absorbing facing on the interior walls of the vehicle to improve the acoustic properties of the interior of the vehicle and to restrict the amount of noise entering the vehicle from the outside. Although the need for such acoustic treatment is somewhat less in the case of passenger automobiles, it is nevertheless highly desirable and probably has not been done heretofore only because of the relatively high cost of such interior wall facings, which costs are practically prohibitive in mass-produced relatively low-priced automobiles.

The cost of such acoustic linings or facings has also restricted their use in other vehicles such as railroad cars and aircraft, but the greatest deterrent heretofore has been the substantial weight of an effective acoustic wall facing that combined the necessary features such as good sound absorbing characteristics with the ability to resist the vibration and wear to which it was subjected in vehicles of these types.

One suggested acoustic facing for such vehicles and which has found limited application especially in aircraft is in the form of a blanket of at least three distinct layers. The first or outerlayer, the one adjacent the interior surface of the wall, is a mat or felt of fibrous material. On the inside of this there is arranged a septum in the form of a sheet such as a woven fabric coated with a suitable resin such as a vinyl resin. The third or inner layer and the one usually forming the visible wall surface was a decorative fabric, sometimes a pile fabric of the kind ordinarily employed as the interior wall surfaces for automobiles.

This type of lining for vehicles has several disadvantages, the most prominent of which is its relatively great weight. It embodied at least three fabrics, each of which was fairly heavy. These three fabrics were secured together usually by stitching, which detracted from the appearance of the lining. In addition, the necessity of three fabrics of which at least two were woven cloth and the need to stitch the fabrics together resulted in a lining or facing that was relatively costly for use even in aircraft and that was so expensive that its use was prohibited in less expensive vehicles such as automobiles.

It is the primary object of the present invention to provide a lining for vehicles in the form of an integral web or fabric that is very light in weight but that combines in a single fabric a high degree of sound absorption or attenuation, resistance to the effects of moisture and a highly decorative appearance.

It is a further object of the invention to provide such a fabric that is highly resistant to fire, that has ample strength to be installed in a vehicle or other enclosure, and that is not deleteriously affected by the vibration usually encountered in vehicles.

It is another object to provide a fabric of high strength although of very light weight and of dimensional stability in directions parallel with its major dimensions so as to be capable of being drawn tautly over wall surfaces, and that is highly resilient in the direction of its thickness. This may be secured in place to a wall or ceiling by relatively few and simple fastening elements and may be clamped along its edges under moldings and the like around windows and other openings in vehicles and room enclosures.

Still further objects of the invention are the provision of a lining that may be made without resorting to weaving operations, that may be produced efficiently at a high rate, and that requires only very simple manufacture operations, all of which contribute substantially to obtaining a decorative sound absorbing lining for vehicles at a cost as low as or in most cases lower than the fabrics or linings presently employed.

The preferred embodiment of the invention comprises a sound absorbing fabric in the form of a highly resilient and strong web or mat of fine glass fibers bonded together into an integral body of very low density. The fibers are of such a size that in addition to being of very low density, the mat has high sound absorbing properties and is an effective sound absorber even if in the form of a relatively thin layer.

This fibrous glass web is provided on one side with a preferably continuous coating of moisture resistant substance such as rubber, resin, or the like. This coating may be moisture impervious to provide a moisture barrier that prevents the entry of moisture vapor into the fibrous web from the warm side of the web, which is usually the side facing the interior of the enclosure. The web or mat is covered on the same side with a layer of short textile fibers of desired kind such as wool, spun silk, rayon, nylon, or other fibers. In the preferred form of the invention these fibers are arranged substantially all normal to the face of the web in simulation of a pile fabric although the invention also encompasses the more or less promiscuous arrangement of the short fibers much in the manner of flock blown or deposited on the coated surface of the web to form a nap surface on the web.

This and several modifications of the invention are shown in the drawings, in which:

Figure 5 is a similar view of another modification; and

Figure 6 is a diagrammatic illustration of one process for manufacturing the lining of the present invention.

Figure 1:
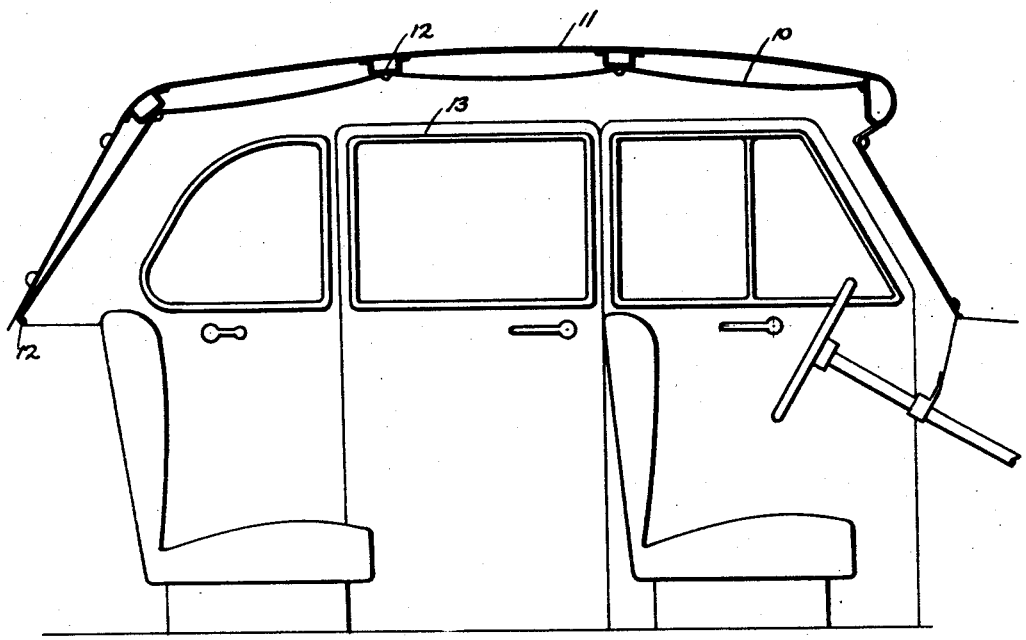
Figure 1 is a schematic sectional view of an automobile showing one use of the lining of the present invention.

As shown in Figure 1 the present lining fabric 10 is arranged to form the interior wall of an automobile 11. The lining may cover the interior of the roof as well as the side walls of the vehicle in the ordinary manner and may be secured at various points 12 to the body of the vehicle, and at the edges of openings in the body of the vehicle the lining may be clamped in the usual way under the ordinary molding or trim strips 13.

The lining 10 comprises a web 15 of fibrous glass bonded into an integral mat of high integrity. Preferably the fibers are of an average diameter in the range of from .00001" to .00025". I have found that mats of glass fibers in these diameters display very high sound absorbing characteristics so that for the present purposes the web of fibrous glass may be relatively thin, for most installations being approximately ⅛ to 1" thick.

The mat is preferably made by depositing by means of a blast of air or gas, long, substantially continuous, fine glass fibers onto a suitable collecting surface. These fine fibers double back and forth on the surface to be haphazardly arranged in horizontal planes but, because of their great length they are predominately parallel with the collecting surface and with the major faces of the mat. The fibers of the mat are bonded together by means of a suitable adhesive such as a resin, for example phenol or urea formaldehyde, and apparently because of the small diameters of the fibers the mat may be of very low density, ordinarily weighing approximately ½ to 1 pound per cubic foot. Such a mat is ideally suited to use as an acoustic lining for vehicles since it combines both extremely light weight and high sound absorbing and attenuating efficiency.

The sound absorbing efficiency or "merit factor," that is, the degree of sound attenuation for a given unit area of the mat at a given thickness and density has been found to vary with the diameter of the fine glass fibers, the finest fibers resulting in a mat whose merit factor is the highest where high pitch sounds are involved. Consequently, when the lining is intended for applications where high pitch sounds are normally encountered it is preferable to employ mats of the finer fibers, say of an average diameter of from .00002" to .00010".

The mat 15 is provided on one face with a preferably continuous coating 17 of moisture resistant material such as rubber-containing compound, a thermoplastic material such as an ethyl cellulose derivative, or a synthetic resin such as phenol formaldehyde, a glycerol-phthalic anhydride resin, or a vinyl resin such as vinyl chloride or vinyl acetate or the copolymers thereof, and other plastics. This coating is preferably sprayed onto the surface of the glass fiber mat but may be applied as well in any other suitable manner as by means of a doctor roll or may be brushed or flowed onto the mat. Certain plastics, for example, ethyl cellulose, may be applied by placing sheets of the material of desired thickness on the surface of the mat, then rendering the sheet tacky or soft by means of solvents or heat and pressing the sheet of softened plastic into intimate contact with the mat to cause it to adhere firmly thereto.

Before the coating 17 is dry and while it is still soft or tacky, or after it has been resoftened, it is covered in suitable manner with a layer of discrete fibers of relatively short length that are caused to adhere to the soft or tacky coating. The coating is then dried or cured to secure the fibers to the surface of the mat. The fibers are preferably textile fibers and may be wool, spun silk, rayon, nylon, cotton and the like. The lengths of the fibers may vary depending upon the results desired but they are ordinarily from about 1/32 to ¼ inch in length.

The fibers 20 may be in any one of several arrangements depending upon the appearance sought in the finished products. Preferably they are all arranged substantially normal to the face of the glass fiber mat so that in appearance the covered mat resembles a pile fabric. Alternatively, however, the fibers may be in more or less heterogeneous arrangement, but in whatever arrangement the coating of fibers on the glass fiber mat contributes substantially to the acoustic properties of the lining.

Due to the high resilience of the mat of very fine glass fibers, a good degree of sound absorption or attenuation is obtained even if the coating 17 is impervious. Apparently the lining is effective to substantial degree to absorb sound waves originating within the enclosure, as a result of the ability of the coated face to vibrate when sound waves impinge it. Further, since most objectionable sounds originate outside the enclosure bounded by the lining, the effectiveness of the lining to attenuate such sound is probably due in large measure to the fact that the outer face of the mat is uncoated and is replete with very small pores.

Figure 3:
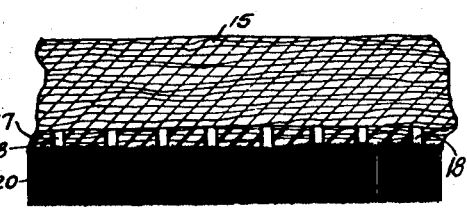
Figure 3 is a similar view on a greatly enlarged scale.

However where desired and where absorption of sound originating within the enclosure is highly important the sound absorbing efficiency may be improved still further by perforating the coating 17 as indicated at 18 in Figure 3 of the drawing before or after the fibers 20 are applied. If the perforating is done before the fibers are applied, the coating is preferably dried before perforating and then after perforating the coating is again rendered tacky or soft by application of a solvent or heat (depending upon the nature of the coating material) and the fibers 20 are applied while the coating is in this condition. The perforating may be done in any desired manner and is preferably performed continuously, for example, by passing the coated glass fiber mat beneath a roll having needles projecting from its surface.

Toward the same end the coating substance may be applied to the face of the mat in amounts just sufficient to provide a secure bond between the face of the mat and the loosely applied fibers 20 so that the interstices in the face of the mat are not all covered, thereby permitting entry of sound waves into the mat and still further increasing the sound absorbing efficiency.

Whether the coating is impervious or not, it forms in effect a reinforcement for the lining by forming a substantially continuous flexible sheet of material. In addition to the inherent strength of this sheet of material, a substantial degree of strength is imparted to the lining by the combination of this resinous coating and the glass fibers at the surface of the mat. As shown in Figure 3, the coating 17 penetrates the surface of the mat so that at least a part of the coating impregnates the mat, and the coating, in effect, is reinforced by the fibers of the mat adjacent the mat surface. Due to the strength of this reinforced coating and to the high integrity of the bonded mat of fine glass fibers, the lining of the present invention is highly resistant to handling and may be drawn taut over the wall of a vehicle or other enclosure. The very light weight of the lining coupled with its high strength permits the lining to be held in place on the wall by relatively few and simple fastening elements.

The fabric of the present invention is relatively non-stretchable and has dimensional stability in directions along its face. It will not sag, loosen or lose its shape under changing atmospheric or temperature conditions.

Figure 4:
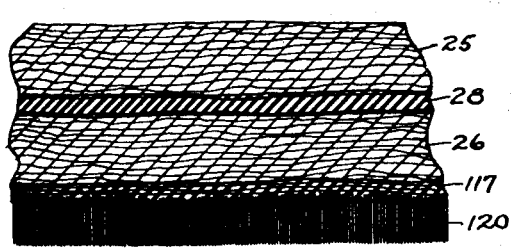
Figure 4 is a schematic sectional view on an enlarged scale of a modified form of the invention.

A modification of the invention is illustrated in Figure 4. In this form the fibrous glass mat comprises two layers 25, 26 of fibrous glass separated by a septum 28. The septum may be a coated fabric, a sheet of resin or similar material, or more desirably, a coating of resin similar to the coating 17. In this latter case the coating may be applied to one of the layers of fibrous glass, preferably the layer 26, and the other layer then superimposed on the coated layer. The superimposed layer may, if desired, be pressed into contact with the coating before it has dried or been cured so that the two layers are bonded together. In this modification, where a septum is located within the body of fibrous glass, the coating 117 on the face of the fiber body may be lighter, ordinarily being only of a thickness sufficient to adhere the flock 120 to the face of the fibrous body.

Figure 2:
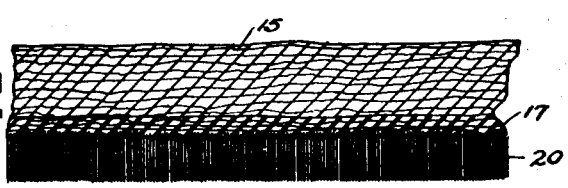
Figure 2 is a schematic sectional view on an enlarged scale of the lining of the present invention.

A second modification of the invention is shown in Figure 5. The fabric 210 of this modification is similar to the preferred form illustrated in Figures 1 to 3, but is provided on its rear face with a suitable abrasion-resistant surface 30. This surface may be in the form of a fabric, for instance, burlap adhered to the fibrous mat 215 by suitable adhesive, or may be in the form of a coating of suitable resin. The other face of the mat is, as in the preferred form, provided with a resinous coating 217 and short fibers 220.

The fabric of Figure 5 is especially adapted for applications where the rear face of the fabric may be exposed in use. This fabric also forms a satisfactory floor covering, although in this latter case the surfacing on the rear face is not always necessary. Also, where both faces of the fabric are exposed, as in the use of fabrics for draperies or curtains, the opposite faces may be similarly treated and both may be provided with a resin coating and have flock adhered thereto in the manner disclosed in the preferred form of the invention.

Although the present lining is highly fire resistant because it is predominantly of fibrous glass, the resistance to fire may be further increased where the need is present by employing a known flameproofed or fire-resistant rubber or resin for the coating 17 and by flameproofing the fibers 20 by suitable methods practiced in the art. Fire resistance is still further increased by substituting for the organic fibers 20, textile glass fibers of uniform short lengths.

Figure 6 illustrates one process that may be employed for producing the acoustic lining of the present invention. In this process a mat or web 15 of bonded fine glass fibers is fed from a suitably supported roll 50 of the web. The web passes beneath a spray 52 adapted to apply the coating to the upper face of the web. While the applied coating is still soft or tacky, the web passes beneath the open lower end of a hood 54, at which point flock is applied to the coated face of the web. The flock may be fed from a supply hopper 56 by means of a usual brush 57 so that the fibers 20 are showered onto the coated face of the web.

The coating material may then be dried either by exposure to the atmosphere or by the application of heat, depending upon the nature of the particular coating substance, so that the fibers 20 are thus bonded to the coated face of the mat. However, if it is desired to enhance the appearance of the coated mat, the mat is passed while the coating material is still soft through an electrical field created by suitable electrodes 58 and 60. These electrodes may be of any suitable kind, for instance such as those disclosed in Patent No. 2,218,445 to Wintermute or in Patent No. 2,222,539 to Meston.

The electrical field set up by the electrodes causes the fibers 20 to all align themselves and extend in substantial parallelism and in a direction normal to the face of the mat. The coating material on the mat is then dried in the atmosphere or by being passed through a drying chamber 62 in which heat is applied to the mat to accelerate the drying or to cure the coating material. The finished lining is then packaged as by being wound into a roll 64 on a suitably supported spindle.

The lining is installed in a vehicle or other enclosure following the established practice for applying presently used fabrics. Normally it is somewhat thicker than present fabrics but because of the very high resilience of the glass fiber mat it may be compressed with the application of very little pressure to a thickness at least the same as the ordinary fabrics so that its attachment by means of fastening elements such as edge moldings and the like requires no changes in the structure of the vehicle.

The fabric of the invention may be also used for wall coverings in rooms in dwellings, for draperies for windows, doors, etc., for curtains for theaters, and as sound absorbing curtains in factories, where the fabric may be hung between or around stations or machines at which loud or objectionable sounds originate. It is ideally suited to these applications since it is not only highly sound absorbent, of high tensile strength, and very light in weight, but it can also be rolled, folded or stretched taut similarly to ordinary cloth. It can be applied over sharp corners and can be cut with ordinary implements and tacked, nailed or stitched to a support or base. The fabric also has substantial thermal insulation properties, which are of value in most of the uses of the fabric.

I claim:

1. A pile surfaced acoustical blanket of textile-like nature comprising a mat of very fine glass fibers haphazardly arranged and bonded together into a compressible integral body of substantial thickness and at a density of about ½ pound per cubic foot, said fibers having an average diameter within the range of .00001 to .0001 inch, a substantially continuous thin yieldable coating of a resinous film forming material on one face of the mat and having needle punched perforations therein, at least a part of said coating impregnating the mat in the region of its surface, whereby the coating is reinforced by the fibers at the surface of the mat and the coating increases the tensile strength of the mat without destroying the flexibility or compressibility thereof, and a layer of discrete fine fibers separately adhered at one end to said mat by said coating to form an erect pile surface of individual fibers thereon.

2. A pile surfaced acoustical blanket of textile-like nature comprising a mat of very fine glass fibers haphazardly arranged and bonded together into a compressible integral body of substantial thickness and at a density of about ½ pound per cubic foot, said fibers having an average diameter within the range of .00001 to .0001 inch, a substantially continuous thin yieldable coating of a resinous film forming material on one face of the mat, at least a part of said coating impregnating the mat in the region of its surface, whereby the coating is reinforced by the fibers at the surface of the mat and the coating increases the tensile strength of the mat without destroying the flexibility or compressibility thereof, a layer of discrete fine fibers separately adhered at one end to said mat by said coating to form an erect pile surface of individual fibers thereon, and a flexible backing sheet adhered to the opposite face of said mat.

GAMES SLAYTER.

REFERENCES CITED

The following references are of record in the file of this patent:

UNITED STATES PATENTS

| Number | Name | Date |
|---|---|---|
| 1,911,605 | Corlette | May 30, 1933 |
| 2,001,970 | Mazer | May 21, 1935 |
| 2,252,157 | Bergin et al. | Aug. 12, 1941 |
| 2,057,731 | Munroe et al. | Oct. 20, 1936 |
| 2,077,262 | Prudden | Apr. 13, 1937 |
| 2,133,238 | Slayter et al. | Oct. 11, 1938 |
| 2,246,040 | Guild | June 17, 1941 |

FOREIGN PATENTS

| Number | Country | Date |
|---|---|---|
| 482,809 | Great Britain | Apr. 5, 1938 |